United States Patent
Püttmann

(10) Patent No.: US 8,757,931 B2
(45) Date of Patent: Jun. 24, 2014

(54) PIPE GUIDE ADAPTER

(75) Inventor: Franz-Josef Püttmann, Lennestadt (DE)

(73) Assignee: TT Schmidt GmbH, Lennestadt (DE)

( * ) Notice: Subject to any disclaimer, the term of this patent is extended or adjusted under 35 U.S.C. 154(b) by 2167 days.

(21) Appl. No.: 10/548,232

(22) PCT Filed: Mar. 4, 2004

(86) PCT No.: PCT/EP2004/002187
§ 371 (c)(1),
(2), (4) Date: Oct. 12, 2005

(87) PCT Pub. No.: WO2004/079252
PCT Pub. Date: Sep. 16, 2004

(65) Prior Publication Data
US 2006/0110219 A1    May 25, 2006

(30) Foreign Application Priority Data
Mar. 5, 2003    (DE) .................. 203 03 596

(51) Int. Cl.
*F16L 7/00*    (2006.01)
(52) U.S. Cl.
USPC ....................................... 405/184.4
(58) Field of Classification Search
USPC ................ 405/184.4; 138/111–114
See application file for complete search history.

(56) References Cited

U.S. PATENT DOCUMENTS

| | | | | |
|---|---|---|---|---|
| 2,551,867 A * | 5/1951 | Bond | | 138/113 |
| 2,706,496 A * | 4/1955 | Bond | | 138/113 |
| 3,213,889 A * | 10/1965 | Cottman, Jr. | | 138/113 |
| 5,127,481 A | 7/1992 | Hesse | | |
| 5,592,975 A * | 1/1997 | Wissmann et al. | | 138/112 |
| 6,003,559 A * | 12/1999 | Baker | | 138/108 |
| 6,158,475 A * | 12/2000 | Clemmer | | 138/112 |
| 6,571,832 B1 * | 6/2003 | Elliott | | 138/108 |
| 6,814,524 B1 * | 11/2004 | Peterson | | 405/230 |
| 6,896,004 B1 * | 5/2005 | Witzel | | 138/112 |
| 7,163,357 B1 * | 1/2007 | Peterson | | 405/230 |
| 7,225,837 B1 * | 6/2007 | Kane | | 138/112 |
| 2005/0224123 A1 * | 10/2005 | Baynham et al. | | 138/106 |
| 2006/0110219 A1 * | 5/2006 | Puttmann | | 405/183.5 |

FOREIGN PATENT DOCUMENTS

| | | |
|---|---|---|
| DE | 197 47 250 | 1/1999 |
| FR | 2 314 309 | 1/1977 |
| WO | WO 93/19322 | 9/1993 |

* cited by examiner

*Primary Examiner* — Tara M. Pinnock
(74) *Attorney, Agent, or Firm* — Henry M Feiereisen LLC

(57) ABSTRACT

A pipe guide adapter for drawing pipes into a channel with the aid of a traction means is provided with ribs which are arranged conically on a base pipe. The ribs ensure guidance of the pipe and, at the same time, a simple construction of the adapter. In addition, the pipe guide adapter can be provided with rollers, which are arranged in the free spaces between the ribs and facilitate the guide function of the pipe guide adapter.

13 Claims, 3 Drawing Sheets

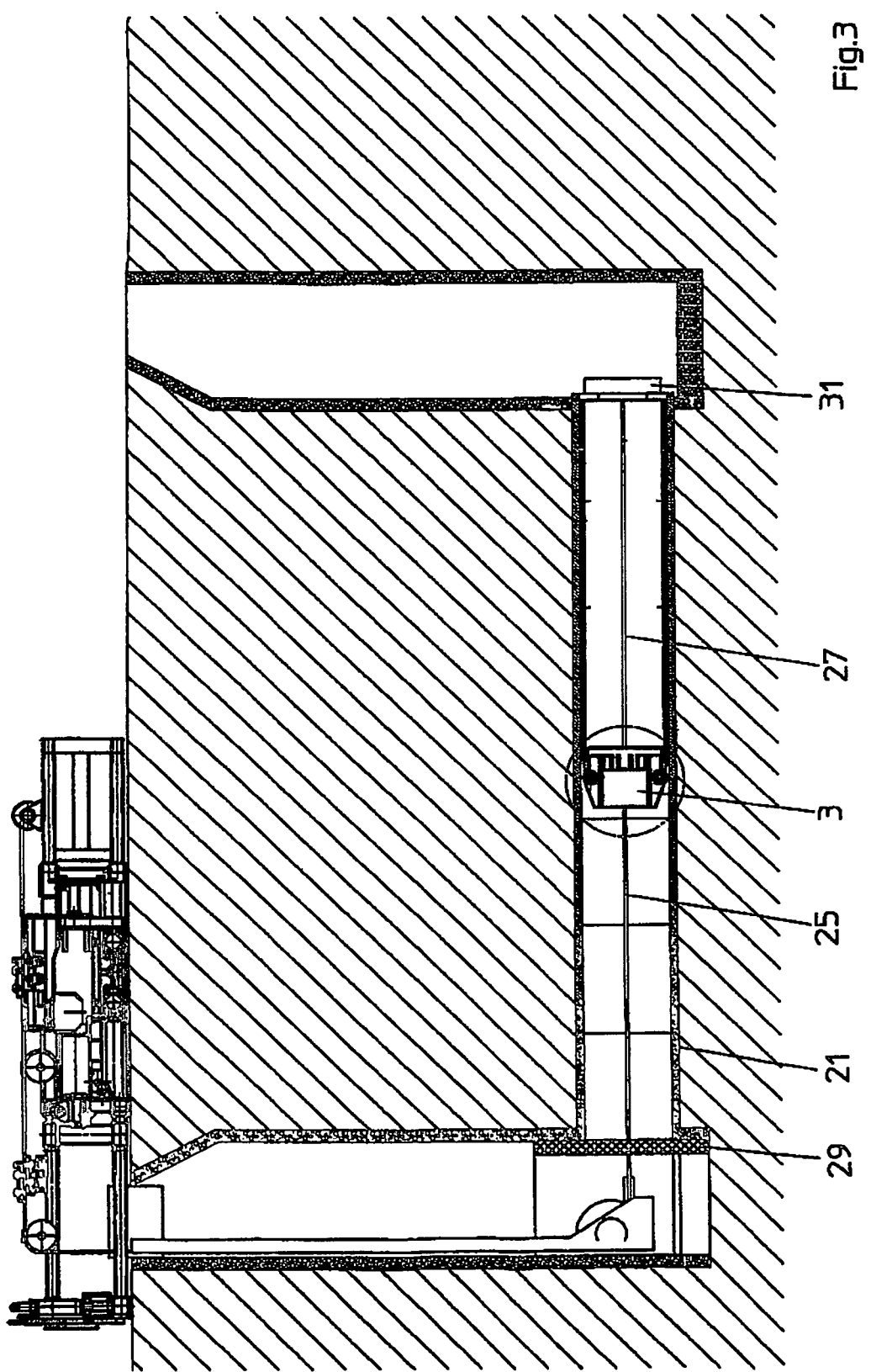

PIPE GUIDE ADAPTER

BACKGROUND OF THE INVENTION

The invention relates to a pipe guide adapter for drawing pipes into a channel in the ground with the aid of a traction means and claims the priority of the German Utility Model 203 03 596.8, to the content of which reference is made.

When drawing pipes into a channel in the ground, such as when drawing a plastic pipe into an existing sewer, as a rule a cable is introduced into the channel and fixed to the front end of the pipe. In order to fix the cable to the front end of the pipe, the pipe can be provided with two holes, into which the traction cable is inserted. This has the advantage of a simple design. Furthermore, the old pipe can continue to be operated as the new pipe is drawn in. It is often the case, however, that the pipe to be drawn in is not to be damaged or material of the new pipe is not suitable to absorb the traction forces acting on the holes at a point.

In order in such cases to apply a tractive force to the pipe to be drawn in, various pipe adapters are known which are inserted into the end of the pipe or placed on the end of the pipe and distribute the tractive force over the entire circumference of the end of the pipe.

Pipe adapters of this type normally comprise an adapter piece which is screwed into the end of the pipe, as described in German laid-open specification DE 197 47 250 A1, clamped or fixed to the end of the pipe via a circumferential groove. These adapters are normally conically formed and turned from solid material. Adapters of this type are, however, expensive and less transportable. In addition, adapters of this type require the operation of the old pipe to be stopped, since they close the pipe. The pipe can only be put into service again when the adapter has been removed from the new pipe.

SUMMARY OF THE INVENTION

The invention is, then, based on the object of providing an improved pipe guide adapter for drawing pipes into a channel in the ground.

The object is achieved by the subject of the independent claims. Advantageous embodiments are the subject of the subclaims.

Irrespective of this, the invention is based on the idea of providing a pipe guide adapter for drawing pipes into a channel which can be produced easily and economically.

One embodiment of the invention is based on the idea of providing a pipe guide adapter for drawing pipes into a channel which permits the new pipes to be drawn in without stopping the operation of the channel or, at least in the event of interruption to the drawing in, permits the channel to be put temporarily into service, in that the pipeline media can move through the new pipe and therefore also flow through the pipe adapter as the new pipe is being drawn in.

The pipe guide adapter for drawing pipes into a channel can have conical ribs arranged concentrically on a base pipe. This permits channel offsets, sleeves, branches or other obstacles to be overcome without difficulty and reduces the frictional resistance as a result of the reduced contact surface. Six to twenty ribs are preferably arranged on a base body.

Furthermore, guide rollers can be arranged between the ribs. These permit a reduction of the resistance when overcoming obstacles in the channel. For example, an offset in the channel, at which a conventional pipe adapter becomes caught or whose resistance is too high to slide over the conical ribs, is overcome without difficulty with the aid of the guide rollers. Depending on the arrangement of the rollers, these can exert a more or less intense deflection function on the end of the pipe, which may be used advantageously in particular in the case of channel offsets. In particular, the risk of the new pipe accelerating forward is avoided, as can occur, for example, when a steel cable is used, if a resistance is initially built up at an obstacle which is then overcome by increasing the tractive force.

The rollers can be arranged in such a way that the roller surfaces bear on the channel wall. For this purpose, the rollers can cover a geometric pipe area whose diameter is equal to or larger than the diameter of the new pipe.

The use according to the invention of ribs means particularly economical fitting of rollers with simple means and avoids the milling out of roller pockets, as would be necessary if a solid roller adapter were used.

For this purpose, the rollers can be mounted by means of a pin in a hole in the ribs.

In order to reduce the costs further, the ribs can be welded as flat bars onto a pipe functioning as the base body.

The join between new pipe and pipe guide adapter can be made via the rear end of the flat bars or via a fitting ring, which is placed on the end of the pipe and into which the pipe adapter is inserted.

The pipe guide adapter is not restricted to the use with a traction means. It can also be operated with a thrust means.

The term "channel" in the sense of the present invention comprises any type of existing channels or channels to be produced, preferably horizontal channels, in a body, in particular channels in the ground, including ground bores, rock bores or underground lines and also underground or overground pipelines and sewers.

The term "pipe" in the sense of the present invention comprises any type of elongated body, including pipelines or cable lines.

The pipe adapter according to the invention is particularly suitable for drawing individual pieces of pipe by means of a steel cable into a channel whose inner circumference is only slightly larger than the circumference of the channel.

BRIEF DESCRIPTION OF THE DRAWING

In the following text, the invention will be explained in more detail by using an exemplary embodiment illustrated in the drawing, in which:

FIG. 3 shows a schematic illustration of a pipe guide adapter according to the invention in a channel with a traction cable device.

DETAILED DESCRIPTION OF PREFERRED EMBODIMENTS

Figure 1:
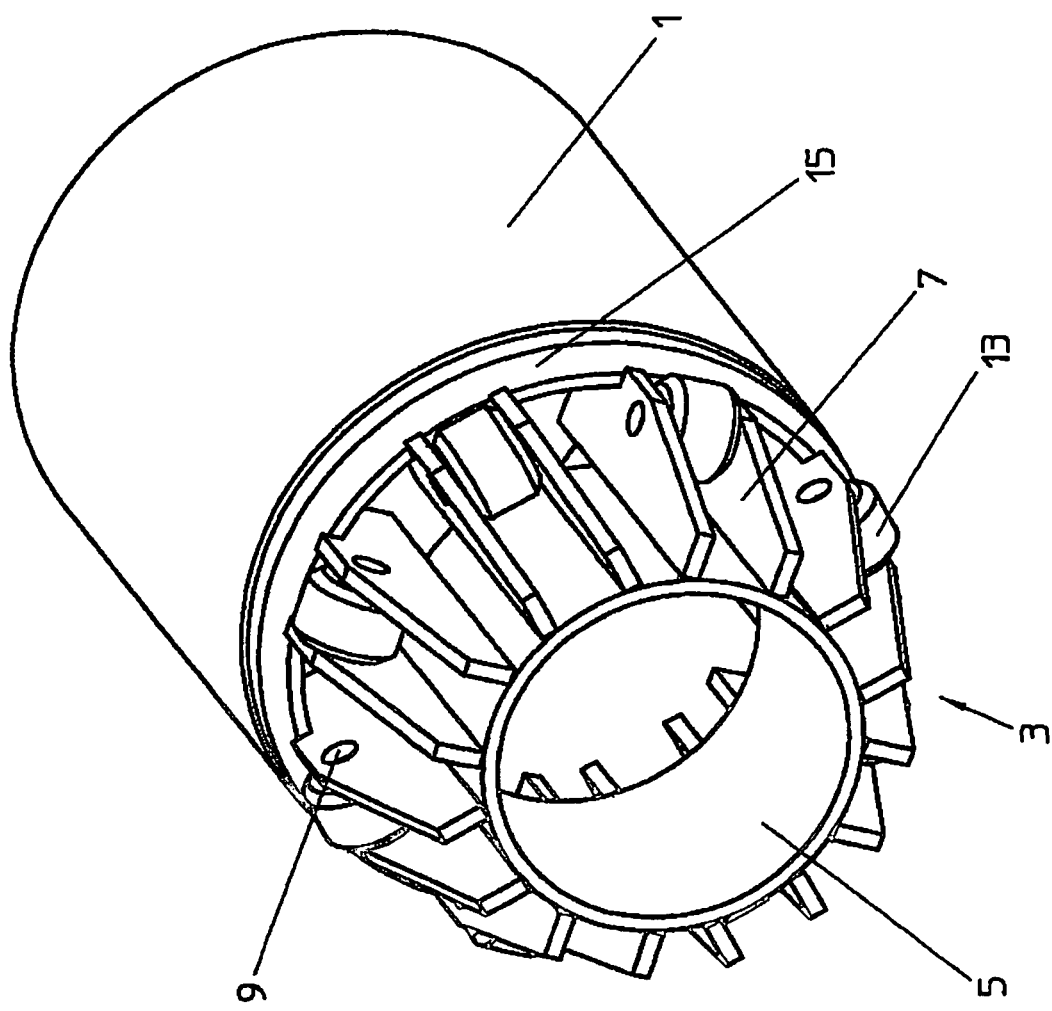
FIG. 1 shows a side view of a pipe guide adapter according to the invention.

The pipe guide adapter is illustrated in FIG. 1 in a pipe 1 to be drawn in. The pipe guide adapter 3 comprises a central base pipe, configured as a hollow carrier 5 with ribs 7 distributed uniformly over the pipe circumference. The ribs 7 are welded onto the base pipe 5 and have holes 9. Lock pins 11, on which rollers 13 are mounted, are inserted into the holes 9.

The rollers 13 are arranged on the ribs in such a way that they project beyond the pipe circumference and can perform a guide function for the new pipe 1 in the channel 21.

In order to insert the pipe adapter 3 into the new pipe 1, the ribs 7 are inserted with their ends into a fitting ring 15, which is in turn inserted into the new pipe or pushed onto the new pipe.

Figure 2:
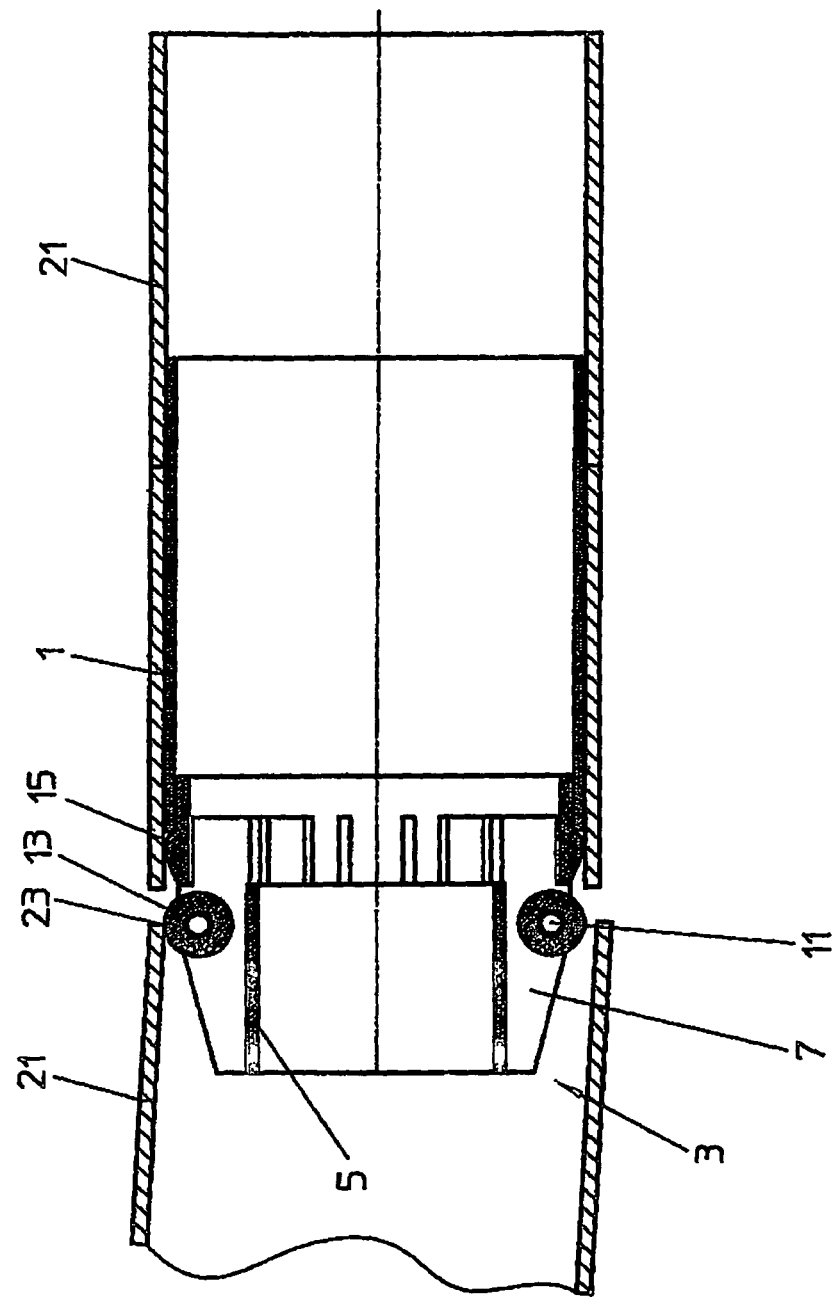
FIG. 2 shows a sectional illustration of the pipe guide adapter of FIG. 1 at a channel offset.

FIG. 2 shows the pipe guide adapter according to the invention at a channel offset. Here, it can be seen how the edge 23 in the channel 21 is overcome with the aid of the rollers 13.

FIG. 3 shows the pipe guide adapter in the underground channel, as it is drawn in between two manholes by a traction cable device 25 and a cable thrust device 27. As can be seen, the channel can readily be put into operation while the pipe guide adapter is still in the channel. In the embodiment illustrated, for example, the drawing-in operation can be interrupted overnight and only the supporting plate 29 and the thrust plate 31 can be removed from the channel in order to continue the operation of the channel during the interruption to the drawing-in procedure.

What is claimed is:

1. A pipe guide adapter for drawing a pipe into a channel with the aid of a traction means, comprising:
    a hollow carrier;
    a plurality of conical ribs arranged concentrically on the hollow carrier for attachment to one end of a pipe and guiding the pipe through the channel;
    at least one guide roller arranged between adjacent ribs; and
    a pin extending between aligned holes of the adjacent ribs to support the guide roller.

2. The pipe guide adapter as claimed in claim 1, wherein at least six ribs are arranged concentrically on the hollow carrier.

3. The pipe guide adapter as claimed in claim 1, wherein the ribs are formed as flat bars welded onto the hollow carrier.

4. The pipe guide adapter as claimed in claim 1, wherein six to twenty ribs are arranged concentrically on the hollow carrier.

5. The pipe guide adapter as claimed in claim 1, further comprising a fitting ring receiving ends of the ribs for attachment of the hollow carrier to the pipe to be drawn in.

6. A pipe guiding device for drawing pipes into a channel in the ground, comprising:
    a pipe guide adapter for attachment to one end of a pipe and guiding the pipe through the channel; and
    a force-application means for operating the pipe guide adapter,
    wherein the pipe guide adapter includes a hollow carrier, and a plurality of conical ribs arranged on the carrier, said pipe guide adapter being positioned between the pipe and the force-application means to transmit a traction force from the force-application means to the pipe.

7. The pipe guiding device as claimed in claim 6, wherein the force-application means is a thrust means.

8. The pipe guiding device as claimed in claim 6, wherein at least six ribs are arranged concentrically on the base pipe.

9. The pipe guiding device as claimed in claim 6, further comprising at least one guide roller arranged between neighboring ribs.

10. The pipe guiding device as claimed in claim 9, wherein the neighboring ribs have aligned holes for receiving a pin, said guide roller being supported by the pin.

11. The pipe guiding device as claimed in claim 6, wherein the ribs are formed as flat bars welded onto the base pipe.

12. The pipe guiding device as claimed in claim 6, wherein the force-application means is a traction means.

13. A method for drawing a new pipe into a channel carrying media, comprising the steps of:
    securing a pipe guide adapter to an end face of a new pipe to be installed; and
    drawing the pipe guide adapter with the new pipe through the channel, while continuing operation of the channel as the new pipe is drawn through the channel or before the drawing step has concluded.

\* \* \* \* \*